United States Patent
Morkel et al.

(10) Patent No.: US 10,211,943 B2
(45) Date of Patent: Feb. 19, 2019

(54) METHOD AND APPARATUS FOR MANAGING A FREQUENCY SPECTRUM IN A WAVELENGTH DIVISION MULTIPLEXING NETWORK

(71) Applicant: ADVA Optical Networking SE, Meiningen OT Dreissigacker (DE)

(72) Inventors: Paul Morkel, Dallas, TX (US); Sorin Tibuleac, Johns Creek, GA (US)

(73) Assignee: ADVA OPTICAL NETWORKING SE, Meiningen OT Dreissigacker (DE)

( * ) Notice: Subject to any disclaimer, the term of this patent is extended or adjusted under 35 U.S.C. 154(b) by 0 days.

(21) Appl. No.: 15/411,490

(22) Filed: Jan. 20, 2017

(65) Prior Publication Data
US 2018/0212704 A1    Jul. 26, 2018

(51) Int. Cl.
*H04B 10/00* (2013.01)
*H04J 14/02* (2006.01)
*H04B 10/27* (2013.01)

(52) U.S. Cl.
CPC .......... *H04J 14/0227* (2013.01); *H04B 10/27* (2013.01); *H04J 14/026* (2013.01); *H04J 14/0224* (2013.01); *H04J 14/0279* (2013.01); *H04J 14/0283* (2013.01); *H04J 14/0284* (2013.01)

(58) Field of Classification Search
USPC .................................................. 398/158–162
See application file for complete search history.

(56) References Cited

U.S. PATENT DOCUMENTS

| | | | |
|---|---|---|---|
| 6,556,328 B1* | 4/2003 | Tanaka | H04B 10/506 372/29.011 |
| 7,061,944 B2* | 6/2006 | DeCusatis | H04B 10/506 372/18 |
| 7,062,166 B2* | 6/2006 | Jacobowitz | H04B 10/697 398/196 |
| 7,558,479 B1* | 7/2009 | Robinson | H04B 10/0795 398/13 |
| 8,867,916 B2* | 10/2014 | Buchali | H04J 14/02 398/43 |
| 9,350,479 B2* | 5/2016 | Sone | H04J 14/0212 |
| 9,444,550 B2* | 9/2016 | Wang | H04J 14/0254 |
| 9,602,306 B2* | 3/2017 | Lopez Alvarez | H04Q 11/0066 |

(Continued)

FOREIGN PATENT DOCUMENTS

| JP | 2012023607 A | 2/2012 |
|---|---|---|
| WO | WO 2015/022034 A1 | 2/2015 |

OTHER PUBLICATIONS

Ghobadi, M., et al., "Evaluation of Elastic Modulation Gains in Microsoft's Optical Backbone in North America," Proc. OFC Conference 2016, Paper M2J.2, pp. 1-3 (2016).

(Continued)

*Primary Examiner* — Agustin Bello
(74) *Attorney, Agent, or Firm* — Jenkins, Wilson, Taylor & Hunt, P.A.

(57) ABSTRACT

A wavelength division multiplexing, WDM, network comprising an apparatus adapted to manage a frequency spectrum in the wavelength division multiplexing, WDM, network, the apparatus comprising an adjustment unit adapted to adjust a frequency offset between carriers for each individual carrier depending on performance characteristics of the individual carriers.

16 Claims, 4 Drawing Sheets

(56) References Cited

U.S. PATENT DOCUMENTS

| | | | |
|---|---|---|---|
| 2005/0286909 A1* | 12/2005 | Kish, Jr. | B82Y 20/00 398/196 |
| 2010/0239260 A1 | 9/2010 | Oikawa et al. | |
| 2014/0161443 A1 | 6/2014 | Zhou | |
| 2014/0205281 A1* | 7/2014 | Sone | H04J 14/0212 398/25 |
| 2014/0270781 A1* | 9/2014 | Nakagawa | H04B 10/60 398/83 |
| 2015/0043919 A1* | 2/2015 | Handelman | H04J 14/02 398/79 |
| 2015/0200790 A1* | 7/2015 | Lopez Alvarez | H04Q 11/0066 398/45 |
| 2015/0222386 A1* | 8/2015 | Patel | H04J 14/0256 398/48 |
| 2016/0164626 A1* | 6/2016 | Cavaliere | H04L 1/0006 398/183 |
| 2016/0277121 A1* | 9/2016 | Millar | H04B 10/6972 |
| 2017/0048134 A1* | 2/2017 | Bruno | H04L 45/125 |
| 2017/0201328 A1* | 7/2017 | Hugi | H04B 10/64 |

OTHER PUBLICATIONS

Pastorelli, R., et al., "Network Planning Strategies for Next-Generation Flexible Optical Networks [Invited]," J. Opt. Commun. Netw. 7:3, pp. A511-A525 (2015).

Velasco, L., et al., "Design and Re-optimization Algorithms for Elastic Optical Networks," Proc. OFC Conference 2016, Paper M2K.1, pp. 1-56 (2016).

Zami, T., "Co-Optimizing Allocation of Nyquist Superchannels and Physical Impairments Aware Placement of Regenerators in Elastic WDM Networks," J. Lightwave Technol. 32, 2830-2840 (2014).

Extended European Search Report for Application No. 17171593 dated Oct. 11, 2017.

\* cited by examiner

METHOD AND APPARATUS FOR MANAGING A FREQUENCY SPECTRUM IN A WAVELENGTH DIVISION MULTIPLEXING NETWORK

TECHNICAL FIELD

The disclosure herein relates to a method and apparatus for managing a frequency spectrum in a wavelength division multiplexing, WDM, network with a self-organizing spectrum.

BACKGROUND

Conventional high-capacity multi-wavelength optical networks have been operated in the past with fixed frequency spacing between optical channels, typically in a range of 25 GHz to 100 GHz. Multiplexing of channels within such a conventional high-capacity multi-wavelength optical network has usually been undertaken with multiplexers based on fixed-grid optical components such as Arrayed Wave-Guide Gratings AWG or Thin Film Filters TFF. A smaller, more narrow channel spacing increases the number of wavelengths available in the optical amplification frequency bands which can have a direct impact on the overall fiber capacity for a given modulation rate per wavelength. Evolution in optical transceiver technology is now resulting in a higher modulation rate capability which requires greater channel passband, and thus channel spacing. Consequently, there has been much interest in flexible grid or flexgrid multiplexing which enables a mixture of channel spacing in the same optical fiber and which allows a mix of modulation rates to achieve a greater fiber capacity than a conventional fixed-grid optical network. A flexgrid optical system also enables groups of channels, or superchannels, to be transported as a single entity without optical filtering between individual channels. This enables channels within the superchannel to be packed closer together without wasting any optical spectrum. However, conventional flexgrid optical systems using superchannels do not account for variations of impairments within a superchannel with multiple transceivers. Individual wavelength paths within a superchannel may vary by several decibels which requires a specification for a worst case and consequently the frequency spectrum usage cannot be optimized.

Accordingly, there is a need to provide a method and apparatus for managing a frequency spectrum in a wavelength division multiplexing, WDM, network where the use of the frequency spectrum is further improved.

SUMMARY

The disclosure herein provides according to a first aspect a method for managing a frequency spectrum in a wavelength division multiplexing, WDM, network comprising adjusting a frequency offset between carriers for each individual carrier depending on performance characteristics of the individual carriers.

In a possible embodiment of the method according to the first aspect of the present disclosure, a frequency offset between neighboring carriers is adjusted for each carrier individually depending on the performance characteristics of the carrier and of respective neighboring carriers.

In a still further possible embodiment of the method according to the first aspect of the present disclosure, the performance characteristics comprise frequency-dependent characteristics including performance characteristics of components of a transmission line of an optical link and/or performance characteristics of transceivers on both sides of an optical link.

In a still further possible embodiment of the method according to the first aspect of the present disclosure, performance characteristics of individual carriers are predicted by a calculation unit during planning of the WDM network.

In a still further possible embodiment of the method according to the first aspect of the present disclosure, performance characteristics of individual carriers are monitored by a monitoring unit during a setup and/or operation of the WDM network.

In a still further possible embodiment of the method according to the first aspect of the present disclosure, performance characteristics of individual carriers are predicted based on predictable performance variations across the WDM network.

In a still further possible embodiment of the method according to the first aspect of the present disclosure, the performance characteristics of individual carriers are predicted or monitored by the monitoring unit continuously during operation of the WDM network and then notified to a controller of the WDM network.

In a still further possible embodiment of the method according to the first aspect of the present disclosure, the controller of the WDM network controls an adjustment unit to adjust dynamically a frequency offset between carriers for individual carriers depending on the performance characteristics predicted or monitored during operation of the WDM network.

In a still further possible embodiment of the method according to the first aspect of the present disclosure, a passband is adjusted for each individual carrier depending on performance characteristics of individual carriers.

In a still further possible embodiment of the method according to the first aspect of the present disclosure, a frequency offset between carriers and/or passband frequency ranges of carriers are adjusted individually in incremental steps during a setup and/or during operation of the WDM network.

In a still further possible embodiment of the method according to the first aspect of the present disclosure, the frequency offset between carriers and/or the passband frequency ranges of carriers are adjusted until an excess signal to noise margin meets predetermined optimization criteria.

In a still further possible embodiment of the method according to the first aspect of the present disclosure, each carrier transports data through an optical link of the WDM network from a transmitter to a receiver.

In a still further possible embodiment of the method according to the first aspect of the present disclosure, performance characteristics of individual carriers are measured by the receiver and notified to a controller of the WDM network which controls an adjustment unit of the transmitter in response to the measured performance characteristics of the carriers to adjust a frequency offset between carriers and/or passband frequency ranges of individual carriers.

In a still further possible embodiment of the method according to the first aspect of the present disclosure, performance characteristics of individual carriers are measured by the receiver and directly notified to the transmitter comprising an adjustment unit which adjusts frequency offsets between carriers and/or passband frequency ranges of individual carriers in response to the measured performance characteristics.

In a still further possible embodiment of the method according to the first aspect of the present disclosure, performance characteristics of individual carriers measured by the receiver are notified directly to the transmitter via an in-band optical supervisory channel, OSC, an in-band data channel using OTN overhead and/or an out-of-band channel.

In a still further possible embodiment of the method according to the first aspect of the present disclosure, the individual carrier forms part of a superchannel comprising or consisting of multiple carriers.

The disclosure herein further provides according to a second aspect an apparatus adapted to manage a frequency spectrum in a wavelength division multiplexing, WDM, network, the apparatus comprising an adjustment unit adapted to adjust a frequency offset between carriers for each individual carrier depending on performance characteristics of the individual carriers.

In a possible embodiment of the apparatus according to the second aspect of the present disclosure, the adjustment unit is adapted to adjust a frequency offset between neighboring carriers for each carrier individually depending on the performance characteristics of the carrier and of respective neighboring carriers.

In a possible embodiment of the apparatus according to the second aspect of the present disclosure, the performance characteristics comprise frequency dependent characteristics including performance characteristics of an optical link and/or performance characteristics of transceivers on both sides of an optical link.

In a further possible embodiment of the apparatus according to the second aspect of the present disclosure, the apparatus further comprises a monitoring unit adapted to monitor performance characteristics of individual carriers during operation of the WDM network.

The disclosure herein further provides according to a third aspect a wavelength division multiplexing, WDM, network comprising an apparatus adapted to manage a frequency spectrum in the wavelength division multiplexing, WDM, network, the apparatus comprising an adjustment unit adapted to adjust a frequency offset between carriers for each individual carrier depending on performance characteristics of the individual carriers.

In a possible embodiment of the WDM network according to the third aspect of the present disclosure, the WDM network comprises a point-to-point network.

In a further possible embodiment of the WDM network according to the third aspect of the present disclosure, the WDM network comprises a ring network.

In a still further possible embodiment of the WDM network according to the third aspect of the present disclosure, the WDM network comprises a mesh network.

BRIEF DESCRIPTION OF THE DRAWINGS

In the following, possible embodiments of the different aspects of the present disclosure are described in more detail with reference to the enclosed figures.

DETAILED DESCRIPTION

Figures 1, 2:
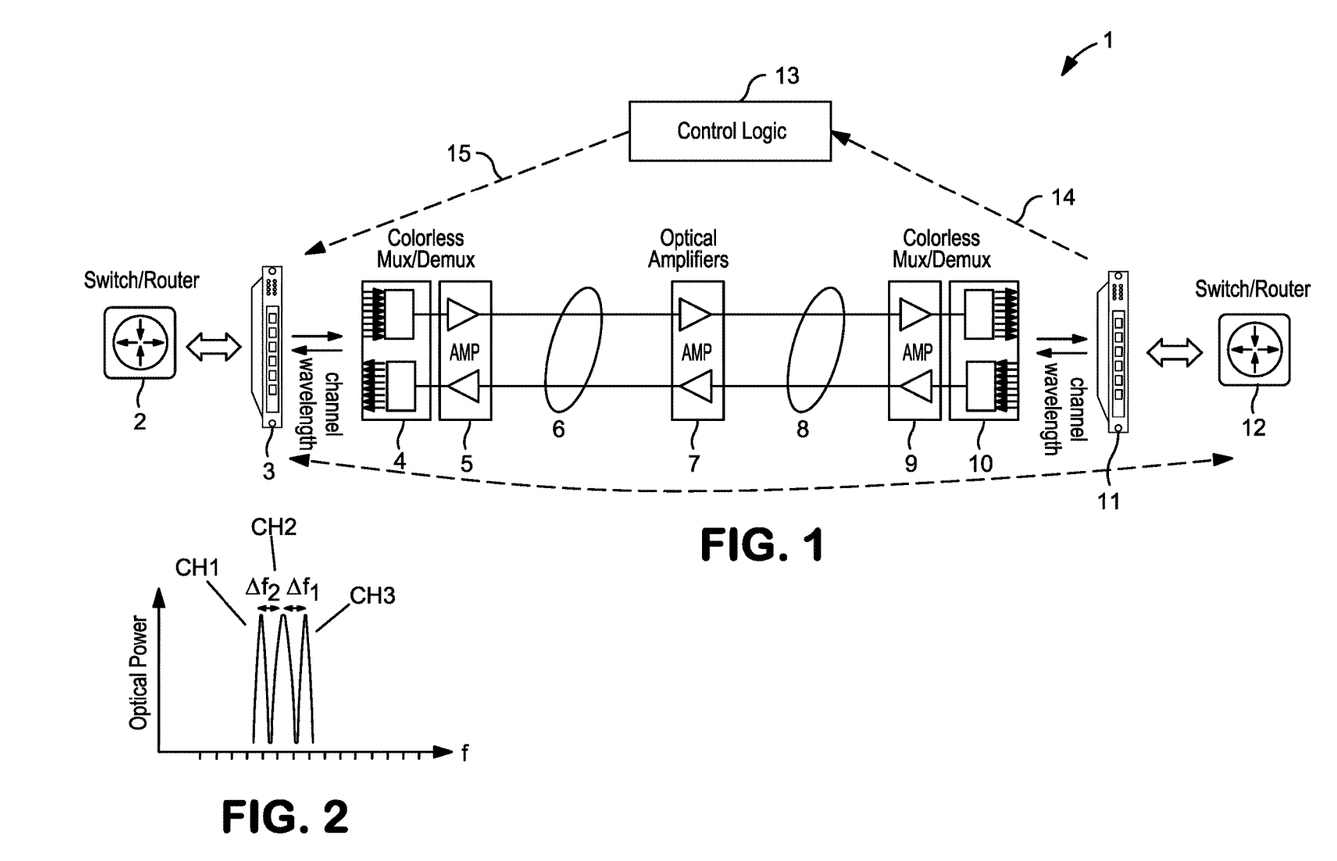
FIG. 1 shows a schematic block diagram for illustrating a possible exemplary embodiment of a WDM network employing a method and apparatus for managing a frequency spectrum of the network according to the present disclosure.
FIG. 2 shows a frequency spectrum illustrating operation of a method and apparatus for managing a frequency spectrum in a wavelength division multiplexing, WDM, network according to the present disclosure.

FIG. 1 shows a schematic block diagram of a possible exemplary embodiment of a wavelength division multiplexing, WDM, network 1 employing a method and apparatus for managing a frequency spectrum according to the first and second aspect of the present disclosure.

A frequency spectrum in the wavelength division multiplexing, WDM, network 1 as illustrated in FIG. 1 is managed by adjusting a frequency offset between carriers for each individual carrier depending on performance characteristics of the respective individual carriers. In the illustrated exemplary embodiment of FIG. 1, the WDM network 1 is a point-to-point optical network. The optical network is a multi-wavelength transport network where the separation of wavelength channels can be controlled for each individual channel. By adjusting a frequency offset between carriers for each individual carrier depending on performance characteristics of the individual carriers, the spectral efficiency can be maximized by removing excess signal to noise ratio SNR and thus maximizing the fiber capacity. This allows network scalability to increase and a lower cost per bit of optical transport. Accordingly, the WDM network 1 as illustrated in FIG. 1 is a WDM transport network with a self-organizing frequency spectrum where the spectral efficiency is maximized.

In the illustrated WDM network 1 of FIG. 1, a switch or router 2 is connected to a first transponder or transceiver 3. The transceiver 3 can comprise a transmitter and/or a receiver. In the illustrated embodiment of FIG. 1, the first transceiver 3 is connected to a colorless multiplexing/demultiplexing unit 4. The multiplexing/demultiplexing unit 4 is connected to an amplifier stage 5. The amplifier stage 5 is connected via an optical link or optical fiber span 6 to a further amplifier stage 7. The amplifier stage 7 in turn is connected via a further optical link or fiber span 8 to an amplifier stage 9 connected to a further colorless multiplexing/demultiplexing unit 10. The colorless multiplexing/demultiplexing unit 10 is connected to a further transponder or receiver 11 as illustrated in FIG. 1. The transceiver 11 is in turn connected to a switch/router 12. The point-to-point connection between the first switch/router 2 and the second switch/router 12 is symmetrical in the illustrated exemplary embodiment of FIG. 1. Both transceivers 3, 11 are connected in the illustrated embodiment to a controller 13 comprising a control logic.

The optical network 1 illustrated in FIG. 1 comprises a multi-wavelength transmission with colorless multiplexing and coherent detection. The optical WDM network 1 can comprise in a possible embodiment a multitude of modulation formats including different signaling baud rates. The optical network 1 can comprise a multitude of individual optical circuit paths sharing the same optical fibers. The optical network 1 can operate with a plurality of optical wavelengths operating with different modulation formats, baud rates all of which may require different local channel spacing. The actual local channel spacing is determined depending on network conditions to optimize the overall system capacity.

The frequency offset between carriers for each individual carrier channel is adjusted depending on the performance characteristics of the individual carriers. The frequency offset between neighboring carriers is adjusted for each carrier individually depending on the performance characteristics of the carrier itself and depending on the performance characteristics of neighboring carriers of the respective carrier. These performance characteristics can comprise frequency dependent characteristics including performance characteristics of components along a transmission line of the optical link and/or performance characteristics of transceivers on both sides of an optical link. For instance, the frequency dependent characteristics can include performance characteristics of the transceivers 3, 11 illustrated in the embodiment of FIG. 1. The performance characteristics of the individual carriers can be predicted in a possible embodiment by a calculation unit during planning of the WDM network 1. Further, the performance characteristics of the individual carriers can be monitored by a monitoring unit during a setup of the WDM network 1 or during the normal operation of the WDM network 1. In a possible embodiment, each transceiver can comprise an integrated monitoring unit adapted to monitor performance characteristics of individual carriers or channels during operation of the WDM network 1. Monitoring of the performance characteristics of the individual carriers can be performed by the monitoring unit continuously during operation of the WDM network and then notified to the controller 13 of the WDM network 1. As schematically illustrated in FIG. 1, the monitoring unit of the second transceiver 11 receiving a signal from the transceiver 3 through the optical link via an optical channel can notify performance characteristics of the respective individual carrier through a data link 14 to the controller 13. The controller 13 comprising a control logic can then control an adjustment unit to adjust dynamically a frequency offset between carriers for individual carriers depending on the performance characteristics monitored during operation of the WDM network. For example, the transceiver 3 in the illustrated embodiment of FIG. 1 can be controlled by the controller 13 through a control link 15. The transceiver 3 can comprise an adjustment unit to adjust dynamically a frequency offset between carriers in response to the control signal received from the controller 13.

In a further possible embodiment, the performance characteristics of individual carriers are predicted based on predictable performance variations across the WDM network 1. The performance characteristics are in a possible embodiment monitored by a receiver that is terminating the optical carrier wherein the receiver is a conventional receiver which may already comprise a suitable monitoring unit.

In a possible embodiment, a passband is adjusted for each individual carrier depending on the predicted or monitored performance characteristics of the individual carriers or channels. In a possible implementation, a frequency offset between carriers and/or passband frequency ranges of the carriers are adjusted individually in incremental steps during a setup phase and/or during operation of the WDM network 1. In a possible implementation, the frequency offset between carriers and/or the passband frequency ranges of carriers can be adjusted until an excess signal to noise margin meets predetermined optimization criteria. Each carrier or channel transports data through the optical link as illustrated in FIG. 1 from a transmitter which may be integrated in the transponder or transceiver 3 to a receiver which may be integrated in the transponder or transceiver 11. The performance characteristics of the individual carriers can be measured or monitored by the respective receiver and notified to the controller 13 of the WDM network 1 which controls an adjustment unit of the transmitter at the other end of the optical link in response to the measured performance characteristics of the carriers to adjust a frequency offset between carriers and/or passband frequency ranges of the individual carriers.

In a possible embodiment, the performance characteristics of individual carriers are measured by a measuring or monitoring unit of the receiver and can be directly notified to the transmitter comprising the adjustment unit. The performance characteristics of individual carriers can be measured and/or monitored by the receiver and then notified directly to the transmitter comprising the adjustment unit via an in-band optical supervisory channel, OSC. In a further possible embodiment, the measured and/or monitored performance characteristics of individual carriers are notified by the receiver in an in-band data channel using an OTN overhead. In a still further possible alternative embodiment, the performance characteristics of individual carriers measured by a measuring and/or monitoring unit of the receiver can be notified directly to the transmitter comprising the adjustment unit via an out-of-band signal channel. In a possible embodiment, the individual carriers can form part of a superchannel comprising or consisting of multiple carriers. In the illustrated embodiment of FIG. 1, a receiver integrated in the transceiver unit 11 can monitor a received bit error rate and notify the controller 13 about the received bit error rate in the individual channel. The controller 13 then controls the adjustment unit of a transceiver on the other side of the optical link by applying a transmitter channel tuning control signal via the control link 15.

The signal channel of the WDM network 1 can comprise in a possible embodiment three main wavelength channel parameters including a baud rate, a modulation depth and a channel offset, i.e. a channel spacing. In a possible embodiment, the baud rate, the modulation depth and the channel offset are variable.

For instance, a 32 GBd QPSK modulation with a nominal 37.5 GHz local channel spacing can be used. Alternatively, a 43 GBd 8QAM modulation can be used with a nominal 50 GHz local channel spacing. Further, a 64 GBd 16QAM modulation may be used with a nominal 75 GHz local channel spacing. In the WDM network 1 according to the present disclosure, the actual local channel spacing is determined to optimize the overall system capacity. The controller 13 allows the spectrum to be managed in the multi-wavelength network 1. A feedback mechanism is provided which allows the frequency spectrum to be managed automatically. In the multi-wavelength network 1 as shown in FIG. 1, individual local channel spacing between channels is defined and controlled at wavelength level for the purpose of maximization of reach performance and/or spectral efficiency and fiber capacity. Optimization of the channel spacing is performed depending on measured and/or monitored transmission impairments for the respective wavelength. All transmission impairments can be determined according to the reach requirement of the respective wavelength, i.e. optical carrier, characteristics of the individual transceivers used for the wavelength or channel, impairments associated with the wavelength's propagation through multiple optical components in the transmission signal path and other factors. For example, a nominal 50 GHz local channel spacing for a 43 GBd 8QAM modulation can actually be set to 47 GHz in a scenario where network impairments are limited enabling a closer packing of the carriers or channels, or may be set alternatively to 53 GHz where measured and/or monitored network impairments are such that the nominal local channel spacing will not provide a sufficient performance. The actual frequencies chosen for a given channel can also be optimized according to known frequency-dependent impairments on the networks, such as a SNR variation. In either case for the above given examples, the objective is to operate the system or network without any excess performance margin.

Individual channel spacing is controlled by using measured performance characteristics of the optical circuit. For example, control of the local channel spacing can be optimized by a closed loop feedback received from the transceivers at either end of the optical link. This may be considered for an initial setup of the optical network and also for a real-time dynamic control based on changing network conditions or aging. A control signal may be generated based on detection of the rate of error correction in a receiver using Forward Error Correction FEC which is typically a good approximation of an uncorrected error rate of the respective circuit. The parameters used for optimization can be predicted or measured using transceiver control signals. The optimization can be undertaken during channel setup or under dynamic control in response to changing network conditions.

FIG. 2 shows a simple frequency spectrum with three channels or carriers. In the illustrated example, the system comprises a low baud rate channel CH1, a high baud rate channel CH2 and another low baud rate channel CH3. The high baud rate channel CH2 is located between the low baud rate channel CH1 and the other low baud rate channel CH3. The frequency offset between the carriers or channels can be adjusted for each individual carrier channel CH depending on the performance characteristics of the individual carriers, i.e. depending on the performance characteristics of the respective carrier itself and depending on the performance characteristics of neighboring carriers. In the illustrated example of FIG. 2, the frequency offset or spacing between the high baud rate channel CH2 in the middle of the spectrum and the neighboring low baud rate channels CH1, CH3 can be adjusted individually depending on the performance characteristics of the high Baud rate channel CH2 itself and depending on the performance characteristics of the two neighboring low baud rate channels CH1, CH3. In a possible embodiment, the frequency offset adjustment or frequency spacing adjustment can be performed continuously depending on the measured and/or monitored performance characteristics of the different carriers or channels.

In a further possible embodiment, the adjusting of the frequency offset between the carriers can be performed event-driven in response to an event occurring in the optical network 1 such as a planned re-routing of traffic. In a still further possible embodiment, the adjusting of the frequency offset or spacing between the carriers can be performed periodically according to a predetermined adjustment period.

The frequency dependent characteristics are usually associated with components of the transmission line, i.e. the optical fiber, the optical amplifiers, the optical switches and other components of the optical network 1. The frequency dependent performance occurs in different frequency regions of the frequency spectrum. The carrier offset can be optimized accordingly using the method and apparatus according to the present disclosure. The performance for each carrier or channel can be impacted by the transmission across the optical network 1, e.g. how far each signal is transmitted, how many and what type of intermediate nodes the carrier has to transit before it is received by the receiver at the far end of the optical link. Performance variations can also be caused by sample variations, different modulation types and varying signal paths across the optical network 1. Accordingly, the performance characteristics do not only comprise frequency dependent variations but also other kinds of performance variations. The controller 13 of the WDM network 1 controls a dynamic adjustment of the frequency offset between carriers for individual carriers depending on performance characteristics which can be monitored during operation of the WDM network 1. Further, there can be a static optimization also even without dynamic optimization.

Figure 3:
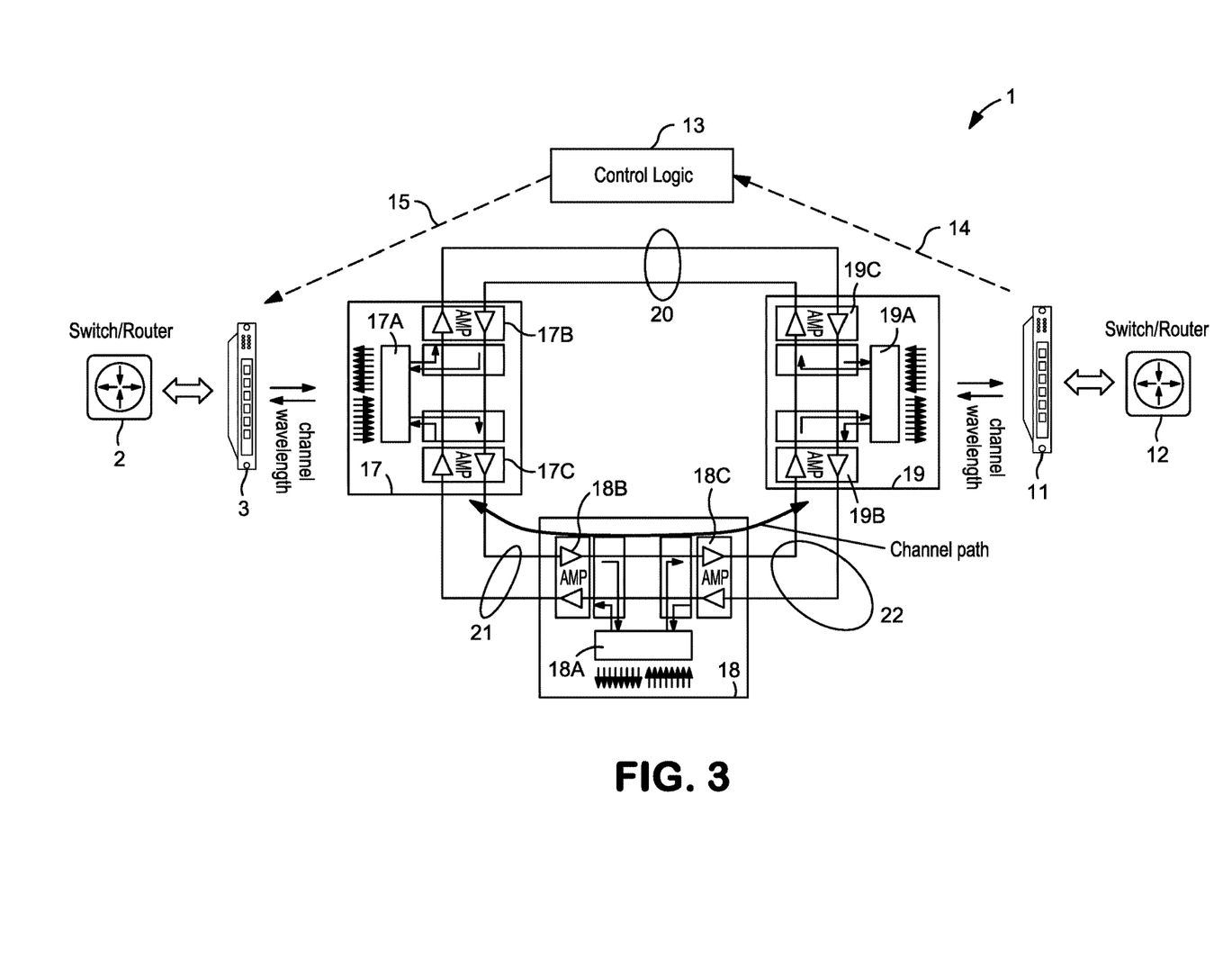
FIG. 3 shows a schematic block diagram illustrating a further possible exemplary embodiment of a wavelength division multiplexing, WDM, network according to an aspect of the present disclosure where signals may transit intermediate nodes.

FIG. 3 shows a schematic diagram of a further possible exemplary embodiment of a WDM network 1 according to the present disclosure. In the illustrated embodiment, the network 1 is a ring network having a ring structure. In the illustrated exemplary implementation of the optical network 1, the network comprises three colorless optical add-drop ROADMs 17, 18, 19. Each of the reconfigurable add-drop multiplexer, ROADM, comprises a colorless multiplexing/demultiplexing unit 17A, 18A, 19A, respectively. On both sides of the multiplexing/demultiplexing unit 17A, 18A, 19A amplifier stages are provided as illustrated in FIG. 3. The add-drop ROADM 17 comprises a first optical amplifier stage 17B and a second optical amplifier stage 17C. The second ROADM 18 comprises a first optical amplifier stage 18B and a second optical amplifier stage 18C. Further, the third ROADM 19 illustrated in FIG. 3 comprises a first optical amplifier stage 19B and a second optical amplifier stage 19C. The optical amplifier stages of a ROADM allow bidirectional optical transmission through an optical fiber span to a neighboring ROADM in the ring structure of the network 1. In the illustrated embodiment, the first ROADM 17 is connected by a bidirectional optical link 20 to the ROADM 19 and through another bidirectional optical link 21 to the second ROADM 18. Further, the second ROADM 18 is connected by a third bidirectional optical link 22 to the third ROADM 19 of the network 1. Accordingly, the optical network 1 comprises in the illustrated embodiment of FIG. 3 a ring structure where three ROADMs 17, 18, 19 are connected to each other by bidirectional optical fiber spans 20, 21, 22. Through the bidirectional optical fiber spans 20, 21, 22, optical signals can be transmitted clockwise or counterclockwise within the ring structure.

The number of carriers or channels within the wavelength division multiplexing network 1 as illustrated in the embodiments of FIGS. 1, 3 can vary. In a possible embodiment, the number of different frequency carriers can be for instance N=128. Some of the channels or carriers can form part of a superchannel. The superchannel comprises a group of neighboring carriers within the spectrum. The frequency offset between the carriers for each individual carrier within the superchannel can be adjusted dynamically depending on performance characteristics of the different individual carriers of the superchannel. In a possible embodiment, each channel comprises three different parameters which can be measured and/or monitored. These parameters can for instance comprise a baud rate, a modulation depth and/or a channel offset or frequency spacing. A frequency offset or spacing between two channels can be adjusted in a possible implementation depending on the bit rates of the two neighboring channels depending on the modulation depth of the two neighboring channels and depending on the original distance of frequency spacing between the two channels. Further, the frequency offset or spacing between the two neighboring channels can be influenced by the performance characteristics of other neighboring channels in the frequency spectrum.

Figure 4:
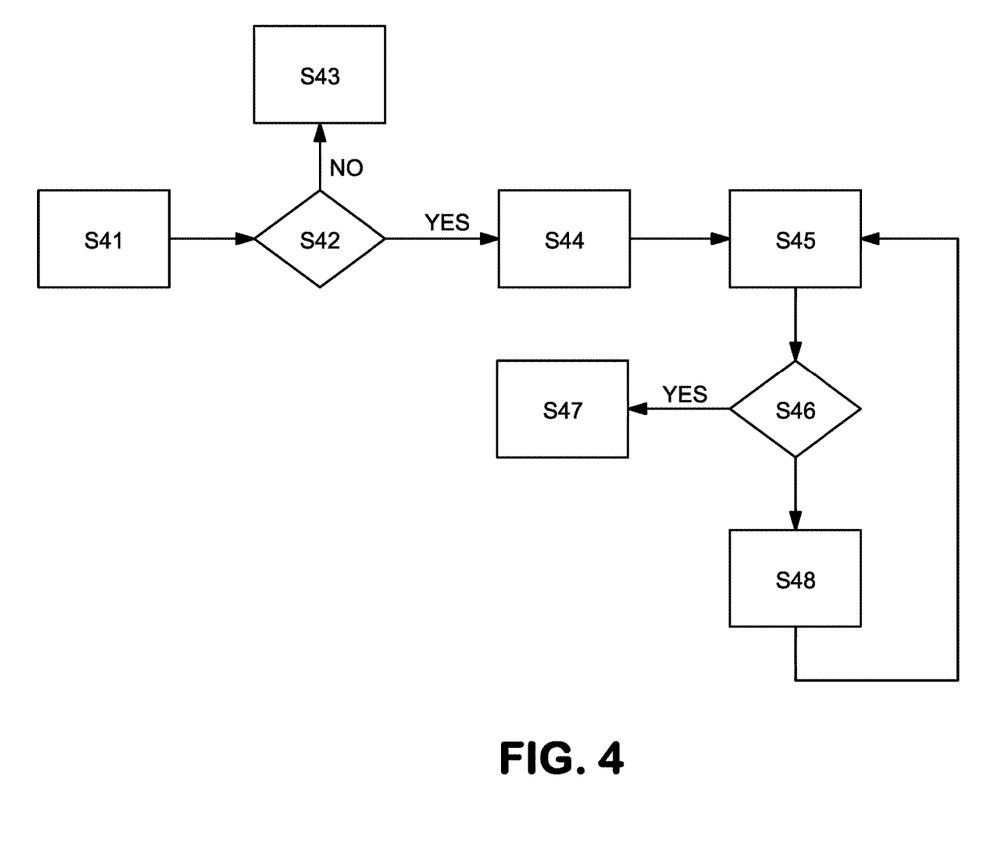
FIG. 4 shows a flowchart illustrating a possible exemplary embodiment of a method and apparatus for managing a frequency spectrum according to the present disclosure describing a process for addition of additional optical carriers to a WDM network.

FIG. 4 shows a flowchart for illustrating the addition of frequency capacity with additional wavelengths, i.e. frequency carriers, in the system according to the present disclosure. In the illustrated example, there may exist a 32 GBd, 16QAM signals on an optical link of a WDM network 1.

In a first step S41 an additional optical carrier can be added to the optical network 1. For instance, a 43 GBd, 16QAM signal may be added as a new carrier to the optical network 1. The initial offset or frequency spacing can be for example 100 GHz.

In a further step S42, it is checked whether there are existing optical carriers in the respective network segment of the optical network 1. If there are no existing potentially conflicting optical carriers in the respective network segment of the optical network 1 the additional optical carrier can be added in step S43 according to a predefined start frequency plan. In contrast, if there are existing optical carriers in the network segment the carrier frequency is allocated for a new optical carrier according to the existing utilization, e.g. with a 100 GHz offset from the lowest existing carrier frequency.

In a further step S45, the error performance, i.e. performance characteristics of the added new optical carrier and the already existing optical carriers within a predefined frequency range of interaction are measured or calculated. In a possible embodiment, performance characteristics are measured using a pre-FEC bit error rate BER on the added new carrier and the other already existing carriers in the frequency range of interaction. Then, the measured or monitored performance characteristics can be compared with performance optimization criteria, e.g. an acceptable bit error rate BER.

In a further step S46, it is checked whether the excess signal to noise margin meets the predetermined optimization criteria, e.g. whether the excess signal to noise margin has been reduced to the optimization criteria. If this is the case an operating frequency for the new optical carrier is set in step S46.

Otherwise, the added carrier optical frequency is tuned in step S48 in incremental steps to decrease the frequency offset from the nearest neighboring carriers and the passband on the transmission path is decreased. Further, it is possible to tune other optical frequency carriers in the predefined range of interaction and to optimize the passband if necessary in step S48. For instance, a frequency offset for the new frequency carrier can be reduced incrementally within one or several iterations, and the passband can be optimized and the frequencies and passbands of already existing frequency carriers are adjusted in the range of interaction of the respective new frequency carrier until predetermined optimization criteria are met in step S48. With the process illustrated in FIG. 4, it is possible to add a new channel or frequency carrier to already existing channels. For instance, to a number N of existing channels, an additional new channel can be added in this way to provide a system with N+1 channels or frequency carriers.

Figure 5:
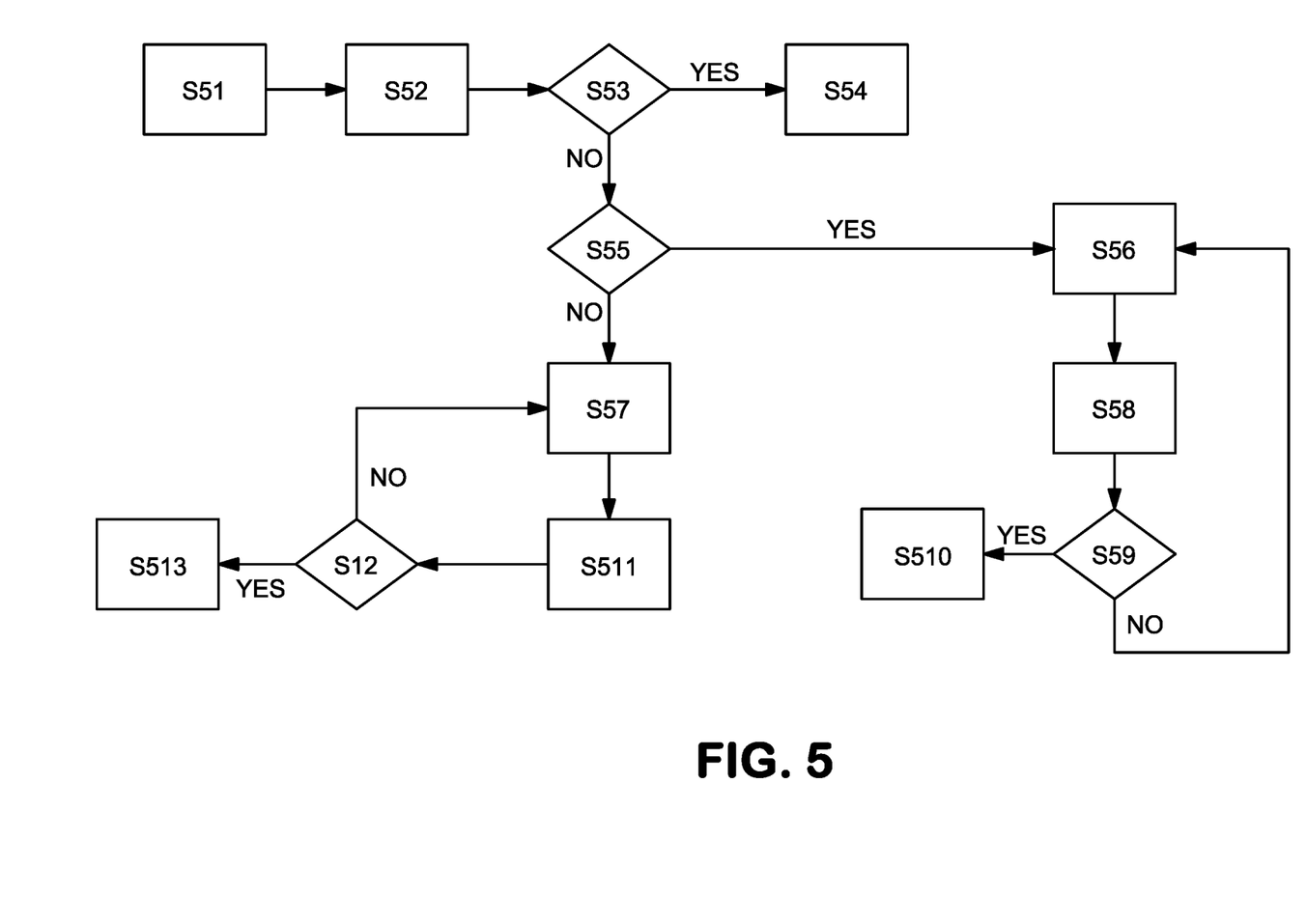
FIG. 5 shows a flowchart illustrating a further exemplary embodiment of a method and apparatus for managing a frequency spectrum in a wavelength division multiplexing, WDM, network according to the present disclosure describing process for dynamic optimization of existing optical carriers on a WDM network.

FIG. 5 shows a flowchart for illustrating an in-service monitoring and optimization in a WDM network 1 according to the present disclosure.

In step S51, the network spectrum optimization process is started. In a further step S52, the error performance, i.e. performance characteristics of all existing optical carriers or channels are measured or calculated.

In step S53, it is checked whether the excess signal to noise margin meets the optimization criteria or not. If this is the case the network spectrum optimization is stopped in step S54 as illustrated in FIG. 5.

In step S55, it is checked whether there is an excess margin at one or more frequency carriers. If this is the case, the process continues with step S56 as illustrated in FIG. 5. Otherwise, the process continues with step S57. In step S56, the optical frequency is tuned for each optical carrier in incremental steps to decrease the frequency offset from the nearest or closest neighboring carriers. Further, the passband frequency on the transmission path is decreased in step S56. Further, optical frequency carriers in a range of interaction can be tuned and a passband can be further optimized if necessary in step S56.

If the result of the check performed in step S55 is negative, i.e. if there is no excess margin at at least one frequency carrier, the optical frequency is tuned by incremental steps for each optical carrier to increase the frequency offset from the nearest neighboring carriers and to increase the passband on the transmission path in step S57. Further, it is possible to tune other optical carriers in a range of interaction and to optimize the frequency passband if necessary in step S57.

After having increased the frequency offset on the nearest neighboring carriers and decreased the passband on the transmission path in step S56, the error performance of each optical carrier and the other existing optical carriers within the range of interaction are measured or calculated in step S58 as shown in FIG. 5. Again, in step S59, it is checked whether the excess margin meets the predetermined optimization criteria. If this is the case the network spectrum optimization is stopped in step S510. Otherwise, the process loops back to step S56 as shown in FIG. 5.

After having increased the frequency offset from the nearest frequency neighboring carriers and increased the passband on the transmission path in an incremental step in step S57, the error performance of each optical frequency carrier and the existing optical carriers within the range of interaction can be calculated or measured in step S511.

In step S512, it is again checked whether the excess margin meets the optimization criteria or not. If the excess margin meets the optimization criteria the network spectrum optimization is stopped in step S513 as shown in FIG. 5. Otherwise, the monitoring an optimization process loops back to step S57 as shown in FIG. 5.

The WDM transport optical network 1 according to the present disclosure is capable to provide a self-organizing frequency spectrum. The spectral efficiency is maximized by removing any kind of excess signal to noise ratio, thus maximizing the use of the available fiber capacity. The multi-wavelength optical network 1 according to the present disclosure provides colorless multiplexing where the channel spacing or frequency offset is defined and optimized at the individual wavelength or carrier level depending on wavelength transmission impairments. The optimization can be undertaken on channel setup, e.g. when adding an optical channel as illustrated in the flowchart of FIG. 4, or under dynamic control during operation in response to changing network conditions as illustrated in the flowchart of FIG. 5.

A feedback-based control of the channel spacing at the wavelength level can provide the most direct control for optimization of the channel spacing and fiber capacity use maximization. A feedback-based control enables a dynamic network optimization in response to changing network conditions.

The invention claimed is:

1. A method for managing a frequency spectrum in a colorless wavelength division multiplexing (WDM) ring or mesh network including a plurality of reconfigurable optical add/drop multiplexers (ROADM) having adjustable passband, the ROADMs being connected through optical fiber spans to allow bidirectional optical transmission of optical signals clockwise or counterclockwise in the ring or mesh network, each ROADM being associated with a transceiver including a monitoring unit monitoring the performance characteristics of the individual carriers continuously during operation of the WDM network and then notifying to a controller of the WDM network through a data link, the method comprising:
adjusting, by the controller, a frequency offset between individual carriers of a superchannel, for each individual carrier, depending on performance characteristics of the individual carriers;
wherein a frequency offset between neighboring individual carriers is adjusted, by the controller, for each carrier individually depending on a performance characteristic of the individual carrier and on the performance characteristics of respective neighboring carriers including the bitrates of neighboring channels, the modulation depth of the neighboring channels, and depending on the original distance of frequency spacing between the channels.

2. The method according to claim 1, wherein the performance characteristics comprise frequency-dependent characteristics including performance characteristics of components of a transmission line of an optical link and/or performance characteristics of transceivers on both sides of an optical link.

3. The method according to claim 1, wherein performance characteristics of individual carriers are predicted by a calculation unit during planning of the WDM network and/or monitored by the monitoring unit during a setup and/or operation of the WDM network and/or based on predictable performance variations across the WDM network.

4. The method according to claim 3, wherein performance characteristics of individual carriers are predicted or monitored by the monitoring unit continuously during operation of the WDM network and notified to the controller of the WDM network.

5. The method according to claim 4, wherein the controller of the WDM network controls an adjustment unit to adjust dynamically a frequency offset between carriers for individual carriers depending on the performance characteristics predicted or monitored during operation of the WDM network.

6. The method according to claim 1, wherein a passband is adjusted for each individual carrier depending on performance characteristics of individual carriers.

7. The method according to claim 1, wherein a frequency offset between carriers and/or passband frequency ranges of carriers are adjusted individually in incremental steps during a setup and/or during operation of the WDM network.

8. The method according to claim 7, wherein the frequency offset between carriers and/or the passband frequency ranges of carriers are adjusted until an excess signal to noise margin meets predetermined optimization criteria.

9. The method according to claim 1, wherein each carrier transports data through an optical link of the WDM network from a transmitter to a receiver.

10. The method according to claim 9, wherein performance characteristics of individual carriers are measured by the receiver and notified to a controller of the WDM network which controls an adjustment unit of the transmitter in response to the measured performance characteristics of the carriers to adjust a frequency offset between carriers and/or passband frequency ranges of individual carriers.

11. The method according to claim 10, wherein performance characteristics of individual carriers are measured by the receiver and directly notified to the transmitter comprising an adjustment unit which adjusts frequency offsets between carriers and/or passband frequency ranges of individual carriers in response to the measured performance characteristics.

12. The method according to claim 11, wherein performance characteristics of individual carriers measured by the receiver are notified directly to the transmitter via an in-band optical supervisory channel, OSC, an in-band data channel using OTN overhead and/or an out-of-band channel.

13. An apparatus adapted to manage a frequency spectrum in a colorless wavelength division multiplexing (WDM) ring or mesh network including a plurality of reconfigurable optical add/drop multiplexers (ROADM) having adjustable passband, the ROADMs being connected through optical fiber spans to allow bidirectional optical transmission of optical signals clockwise or counterclockwise in the ring or mesh network, each ROADM being associated with a transceiver including a monitoring unit monitoring the performance characteristics of the individual carriers continuously during operation of the WDM network and then notifying to a controller of the WDM network through a data link, the apparatus comprising:
an adjustment unit adapted to adjust a frequency offset between individual carriers, for each individual carrier, depending on performance characteristics of the individual carriers;
wherein a frequency offset between neighboring individual carriers is adjusted for each carrier individually depending on the performance characteristic of the individual carrier and on the performance characteristics of respective neighboring carriers including the bitrates of neighboring channels, the modulation depth of the neighboring channels, and depending on the original distance of frequency spacing between the channels.

14. The apparatus according to claim 13, wherein the performance characteristics comprise frequency dependent characteristics including performance characteristics of an optical link and/or performance characteristics of transceivers on both sides of an optical link.

15. The apparatus according to claim 13, further comprising a monitoring unit adapted to monitor performance characteristics of individual carriers during operation of the WDM network.

16. A colorless wavelength division multiplexing (WDM) network comprising an apparatus adapted to manage a frequency spectrum in the WDM network including a plurality of reconfigurable optical add/drop multiplexers, ROADM, having adjustable passband, the ROADMs being connected through optical fiber spans to allow bidirectional optical transmission of optical signals clockwise or counterclockwise in the ring or mesh network, each ROADM being associated with a transceiver including a monitoring unit monitoring the performance characteristics of the individual carriers continuously during operation of the WDM network and then notifying to a controller of the WDM network through a data link, the apparatus comprising an adjustment unit adapted to adjust a frequency offset between individual carriers, for each individual carrier, depending on performance characteristics of the individual carriers;

wherein a frequency offset between neighboring individual carriers is adjusted for each carrier individually depending on the performance characteristic of the individual carrier and on the performance characteristics of respective neighboring carriers including the bitrates of neighboring channels, the modulation depth of the neighboring channels, and depending on the original distance of frequency spacing between the channels.

* * * * *